United States Patent

Tominaga et al.

[11] 4,322,141

[45] Mar. 30, 1982

[54] DISTANCE INDICATION ARRANGEMENT FOR AUTOMATIC FOCUS CONTROL CAMERA

[75] Inventors: Shinji Tominaga, Sakai; Motonobu Matsuda, Kawachinagano, both of Japan

[73] Assignee: Minolta Camera Kabushiki Kaisha, Osaka, Japan

[21] Appl. No.: 197,010

[22] Filed: Oct. 14, 1980

[30] Foreign Application Priority Data

Nov. 14, 1979 [JP] Japan ................................ 54-148025

[51] Int. Cl.³ ............................................... G03B 7/08
[52] U.S. Cl. ..................................... 354/25; 354/60 L; 354/198
[58] Field of Search ............... 354/25, 60 L, 198, 289, 354/53, 60 E; 355/56

[56] References Cited

U.S. PATENT DOCUMENTS

| | | | |
|---|---|---|---|
| 3,443,502 | 5/1969 | Harvey | 354/25 |
| 4,043,677 | 8/1977 | Toyoda | 354/53 X |
| 4,192,590 | 3/1980 | Kitaura | 354/60 L X |
| 4,198,141 | 4/1980 | Tomizaga et al. | 354/60 L X |
| 4,223,987 | 9/1980 | Shimizu et al. | 354/60 E X |
| 4,235,547 | 11/1980 | Iwata | 354/198 X |
| 4,238,154 | 12/1980 | Biber et al. | 354/198 |

FOREIGN PATENT DOCUMENTS 50-115524 of 1975 Japan .
52-23260 of 1977 Japan .
54-34734 of 1979 Japan .

*Primary Examiner*—Michael L. Gellner
*Attorney, Agent, or Firm*—Wenderoth, Lind & Ponack

[57] ABSTRACT

An improved distance indication arrangement for use in an automatic focus control camera in which a distance signal produced by a distance measuring device is utilized for giving warning so as to prevent under-exposure in the case of flash light photographing.

6 Claims, 3 Drawing Figures

DISTANCE INDICATION ARRANGEMENT FOR AUTOMATIC FOCUS CONTROL CAMERA

BACKGROUND OF THE INVENTION

The present invention generally relates to a photographic camera and more particularly, to a distance indication arrangement for a photographic camera equipped with automatic focus control means or an automatic focus control camera.

Generally, in a photographic camera which employs, among automatic distance measuring devices conventionally proposed, an automatic distance measuring device of a type capable of measuring distance without utilization of surrounding light such as natural light or the like, there has been such a disadvantage that an improper or incorrect exposure takes place in photographing, if the distance indicated by the distance signal produced from the automatic distance measuring device exceeds the photographic associated distance of flash means such as an electronic flash employed therefor. On the assumption that the guide number GN of the electronic flash employed is 12 and the maximum f-number F of the photographing lens of the camera is 2.8, the maximum distance up to an object to be photographed in which the correct exposure is available in the above photographing by the electronic flash is approximately 4.3 m, and any objects located farther than the above distance are undesirably subjected to under-exposure due to an insufficient amount of light.

SUMMARY OF THE INVENTION

Accordingly, an essential object of the present invention is to provide a distance indication arrangement for an automatic focus control camera which is capable of warning a photographer in advance so as to prevent underexposure in the case of flash light photographing, through utilization of a distance signal obtained by a distance measuring device.

Another important object of the present invention is to provide a distance indication arrangement of the above described type which indicates the distance signal produced by the distance measuring device in such a manner that, when the distance represented by the distance signal exceeds a photographing associated distance of the electronic flash employed, an out-of-association warning indication is given by a distance indication device together with the distance indication so as to prevent photographing which may result in under-exposure.

A further object of the present invention is to provide a distance indication arrangement of the above described type which is simple in construction and accurate in functioning with high reliability, and can be readily incorporated into automatic focus control cameras at low cost.

In accomplishing these and other objects, according to one preferred embodiment of the present invention, there is provided a distance indication arrangement for use in a photographic camera having distance measuring means for producing a distance signal corresponding to a distance up to an object to be measured for distance, and lens adjusting and setting means for adjusting and setting a photographing lens of the photographic camera to a position corresponding to the distance signal produced from the distance measuring means. The distance indication arrangement includes a distance indication device for effecting a zone indication of the distance corresponding to the distance signal, a flash photographing assocation distance signal generation circuit for producing a signal corresponding to the photographing association distance of the flash means employed, an out-of-association detection circuit for producing an out-of-association signal when the distance corresponding to the zone indication exceeds the photographing association distance of the flash means, and a warning indication signal generation circuit for producing a signal of warning indication in response to the out-of-association signal.

By the arrangement according to the present invention as described above, an improved distance indication arrangement capable of giving a warning when an object to be photographed is out of photographing association distance in the flash photographing, has been advantageously presented, with substantial elimination of the disadvantages inherent in the conventional distance indication arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
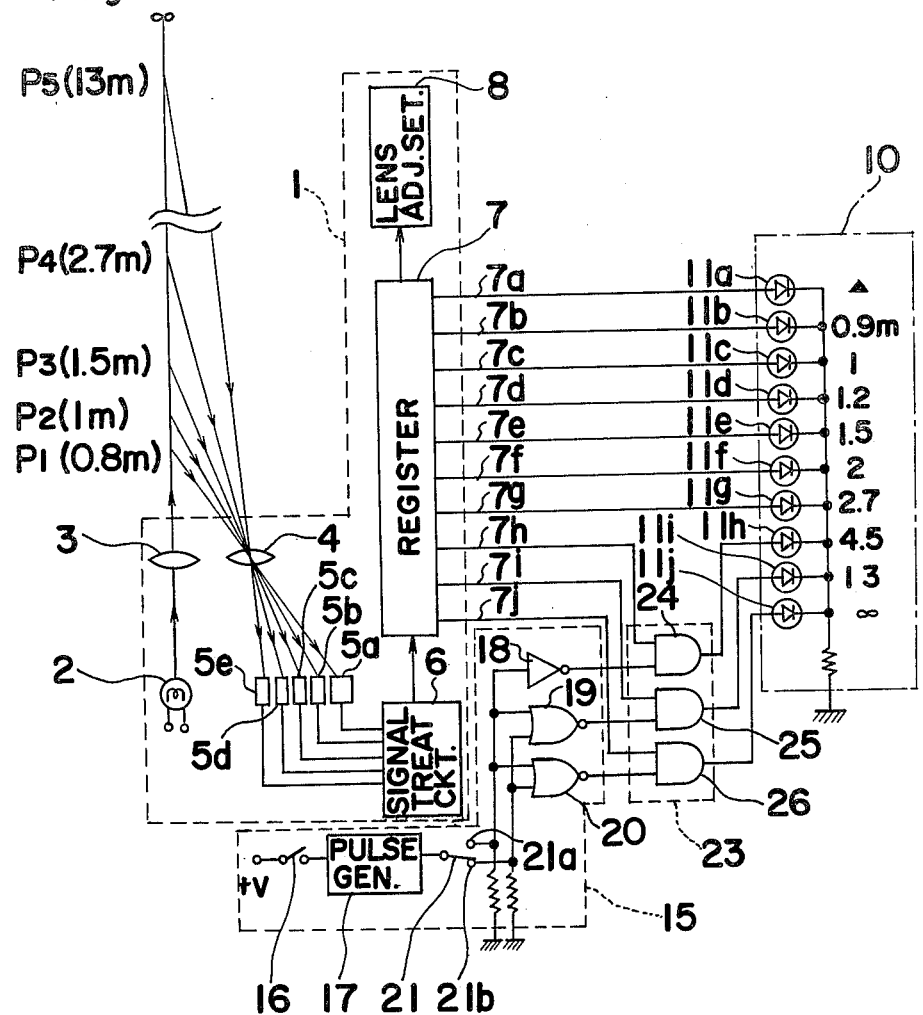
FIG. 1 is a circuit block diagram showing the construction of a distance indication arrangement according to one preferred embodiment of the present invention.

Referring now to the drawings, there is shown in FIG. 1 the construction of a distance indication arrangement for an automatic focus control camera according to one preferred embodiment of the present invention. In FIG. 1, a known distance measuring device 1 of light beam projection type, based on the principle of trigonometric distance measurement, includes a light source 2, for example, of an infrared light emitting diode type which is arranged to be energized at a first stage of depression of a shutter release button (not shown). The light from the light source 2 is condensed by a condenser lens 3 into a beam configuration so as to be projected toward an object to be measured for distance, while the image of the object to be measured for distance is formed on an image forming surface through another lens 4 disposed in a position side by side with and at a predetermined distance from the lens 3. On the image forming surface of the lens 4, there are arranged a plurality of photodiodes 5a, 5b, 5c, 5d and 5e for receiving light rays reflected from points P1, P2, P3, P4 and P5 which are respectively at distances of 0.8 m, 1 m, 1.5 m, 2.7 m and 13 m from the lens 3. Output signals from the photodiodes 5a, 5b, 5c, 5d and 5e are applied to a signal treating circuit 6 which detects particular photodiodes 5a to 5e upon which the reflected light is incident, and produces, for example, ten kinds of distance signals including distance information equivalent to infinity based on presence or absence of light incident upon the respective photodiodes 5a to 5e and the combination thereof. The above distance signals are applied to a register 7, coupled to the signal treating circuit 6, so that the distance signals are stored therein as the distance information, and simultaneously, when any one of output terminals 7a, 7b, 7c, 7d, 7e, 7f, 7g, 7h, 7i and 7j becomes "high", the "high" signal is applied to a lens adjusting and setting mechanism 8 which is connected to the register 7. Upon depression of the shutter release button to a second stage, the lens adjusting and setting mechanism 8 adjusts and sets a photographing lens (not shown) to a position corresponding to the distance signal stored in the register 7.

Figure 2:
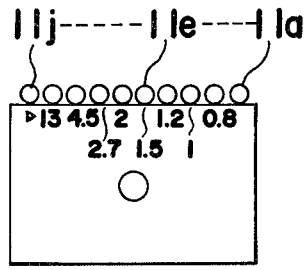
FIG. 2 is a schematic diagram showing the disposition of light emitting diodes in a camera finder employed in the arrangement of FIG. 1.

Meanwhile, the distance indication device 10 which indicates the distance up to the object to be photographed includes a plurality of light emitting diodes 11a, 11b, 11c, 11d, 11e, 11f, 11g, 11h, 11i and 11j whose anodes are connected to the corresponding output terminals 7a to 7j of the register 7 and which are arranged in one row together with numerals representing distances, for example, at an upper portion of a camera view-finder as shown in FIG. 2.

The electronic flash photographing association distance signal and warning signal generating circuit 15 comprises a switch 16 which is to be closed in association with turning ON of the power supply for an electronic flash (not shown) incorporated in the camera, a pulse generation circuit 17 which is actuated upon closing of the switch 16 for producing pulses having a period, for example, of 0.5 sec., an inverter 18, and NOR circuits 19 and 20. As described later, the output pulses from the above pulse generating circuit 17 are arranged to be applied, for example, to the light emitting diodes 11h, 11i and 11j of the distance indication device 10 which indicate the distance determined by the guide number of the electronic flash and, the maximum f-number of the photographing lens, and also distances further than said distance. The circuit 15 as described above further includes a change-over switch 21 to be actuated in association with the setting of film sensitivity and having a stationary contact 21a connected to one input terminal of each of the inverter 18 and NOR circuits 19 and 20, and another stationary contact 21b connected to the other input terminals of said NOR circuits 19 and 20. Accordingly, by the changing over of the switch 21, the output pulses from the pulse generation circuit 17 are applied either to the light emitting diodes 11h, 11i and 11j or to the light emitting diodes 11i and 11j, so as to allow the above electronic flash photographing association distance indication to be altered.

On the other hand, the electronic flash photographing out-of-association detection circuit 23 includes AND circuits 24, 25 and 26 inserted between the output terminals 7h, 7i and 7j of the register 7 and the light emitting diodes 11h, 11i and 11j so as to be applied with outputs from the inverter 18 and NOR circuits 19 and 20.

By the above arrangement, it is assumed that a photographing lens having minimum f-number or fully open aperture value of F2.8 and an electronic flash having the guide number of GN12 with respect to film sensitivity of ASA100 are incorporated in the camera body (not shown), with the lens aperture being set to a desired f-number through adjustment by a known flash-matic mechanism. Note that, since the film sensitivity is ASA100 in the above case, the change-over switch 21 of the electronic flash photographing association distance signal and warning signal generation circuit 15 has been changed over to the side of the contact 21a in the similar manner as in the case of ASA50, and that, in the case of film sensitivities of ASA200 and ASA400, the switch 21 is to be changed over to the side of contact 21b.

Firstly, in the state where the above electronic flash is not used, the light source 2 is energized at the first stage of depression of the shutter release button, and the distance measuring is effected by the distance measuring device 1, with the distance signal stored in the register 7, and thus, a "high" signal is assumed to be produced, for example, from the output terminal 7h. In the above state, since the electronic flash is not used and the switch 16 is in the OFF state, with the pulse generation circuit 17 being in non-functioning state, the input signal to the inverter 18 is of "low", while the output signal therefrom is of "high", and the AND circuit 24 is functioning. Therefore, the "high" signal from the output terminal 7h of the register 7 is applied to the light emitting diode 11h through the AND circuit 24 for continuously lighting said diode 11h, and thus, it is indicated that the distance from the lens 3 to the object to be photographed is in the region before or after 4.5 m as a central point.

Subsequently, at the second stage of depression of the shutter release button, the photographing lens (not shown) is adjusted to be set for standing-by at the position corresponding to the distance signal stored in the register 7 by the lens adjusting and setting mechanism 8.

In the above state, upon turning ON of the switch 16 for electronic flash photographing, the pulse generation circuit 17 is actuated to produce output pulses which are applied to the AND circuits 24, 25 and 26 through the contact 21a, inverter 18, and NOR circuits 19 and 20. Since the photographing lens having fully open aperture value of F2.8 and the electronic flash having the guide member of GN12 are employed as stated earlier, the photographing association distance for the electronic flash is 4.3 m. Accordingly, the output pulses from the pulse generation circuit 17 are applied to the light emitting diode 11h through the AND circuit 24 to which the "high" signal is applied from the output terminal 7h of the register 7, and thus, the diode 11h continuously flickers at a predetermined period, by which it is judged for indication that the distance up to the object to be photographed as measured by the distance measuring device 1 is out of the photographing association range of the electronic flash.

Meanwhile, in the case where the film sensitivity is ASA200 or ASA400, the change-over switch 21 has been changed over to the side of the contact 21b as described earlier, and the photographing association distance for the electronic flash has been altered, for example, to 8 m, while the output pulses from the pulse generation circuit 17 are being applied to the AND circuits 25 and 26 through the contact 21b and NOR circuits 19 and 20. Therefore, if the distance up to the object to be measured for distance is 4.5 m or thereabout as described earlier, the light emitting diode 11h is continuously lit to effect the indication that the distance is within the photographing association range of the electronic flash. Similarly, when the distance up to the object to be measured for distance is 13 m or thereabout, the output pulses are applied through the AND circuit 25 in the similar manner to cause the light emitting diode 11i to continuously flicker for indication that the distance is out of the photographing association range of the electronic flash.

As described in the foregoing, even a person unskilled in the electronic flash photographing can readily avoid failure due to under-exposure based on the contents of the indications by the respective light emitting diodes 11.

It is to be noted here that, in the foregoing embodiment, although the description has been mainly given with respect to the arrangement in which the photographing lens has the fully open aperture value of F2.8, with the guide number GN of the electronic flash being 12, the arrangement should of course be correspondingly modified, in the case where the fully open aperture value, guide number, number of the distance zones to be indicated, and width of each zone, etc. are different from the above. Meanwhile, it is necessary that the distance measuring device 1 as described above is capable of measuring distance with respect even to such an object to be photographed as will not give the correct exposure unless an auxiliary light source is employed, and is provided with means for storing the measured distance value, and therefore, the distance measuring device 1 may be one which measures distance by utilizing the propagation time of sound waves or one utilizing contrast of dark and light portions of the object to be photographed through employment of auxiliary light depending on the state of the surrounding light.

On the other hand, the warning indication described as effected by causing the light emitting diode 11 indicating the distance up to the object, the flicker in the foregoing embodiment, may be so modified that when films having predetermined sensitivities, for example, of ASA50 and 100 are employed, the light emitting diode 11h flickers, while if films with sensitivities of ASA200 and 400 are employed, the light emitting diode 11i flickers, or that a particular light emitting diode, for example, the diode 11j is exclusively caused to flicker irrespective of the film sensitivities. Moreover, it is also possible to arrange in such a manner that a particular light emitting diode and the light emitting diode effecting the distance indication are alternately caused to flicker, with simultaneous warning by sound.

Figure 3:
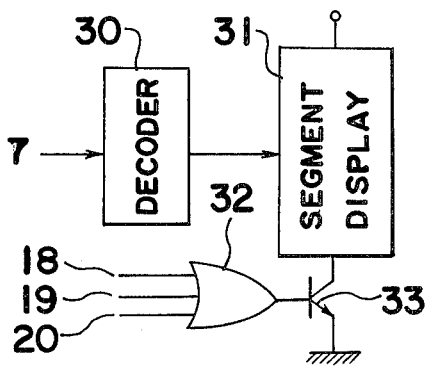
FIG. 3 is a circuit block diagram showing a modification of the distance indication arrangement according to the present invention.

Furthermore, as shown in FIG. 3, it may be so arranged that the distance indication is effected by applying the outputs from the respective output terminals of the register 7 to a segment display member 31 through a decoder 30, while the outputs from the inverter 18, and NOR circuits 19 and 20 are applied, through an OR circuit 32, to the base of a switching transistor 33 inserted between the segment display member 31 and the ground for causing the segment display member 31 to continuously flicker.

As is clear from the foregoing description, according to the arrangement of the present invention, it is arranged that in a camera equipped with the automatic focus adjusting means and distance indication device, warning is given in the distance indication device when the object to be photographed is out of the photographing association distance range in the electronic flash photographing, and therefore, even a person not accustomed to electronic flash photographing can readily avoid failures which may result in under-exposure, and operate the camera without uneasiness.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. In a camera for use with an electronic flash device including an objective, a distance measuring means for producing a distance signal representative of a distance up to a target object and a lens adjusting and setting means for adjusting and setting said objective to a position corresponding to said distance signal from said distance measuring means, a distance indication device comprising:

indication means for indicating the distance up to said target object in response to said distance signal;

an electric circuit for causing said indication means to make a continuous indication in response to said distance signal when said distance signal represents a distance within a maximum flash association distance and for causing said indication means to make an intermittent indication in response to said distance signal when said distance signal represents a distance outside of the maximum flash association distance, the maximum flash association distance being determined by the guide number of said electronic flash device, the value of a fully open aperture of said objective and a set film sensitivity; and switch means for changing the range where said electric circuit causes said indication means to make the intermittent indication in association with film sensitivity setting.

2. A distance indication device as defined in claim 1, wherein said distance measuring means includes a plurality of output terminals and is adapted to produce a zone distance signal as said distance signal at one of said output terminals and wherein said indication means includes a plurality of light emitting elements arranged in a row within a view-finder of said camera and selectively energized in response to said zone distance signal, the number of said output terminals and the number of said light emitting elements being equal to the number of predetermined distance zones and each of said output terminals and each of said light emitting elements corresponding to a different one of said predetermined distance zones.

3. A distance indication device as defined in claim 2, wherein said electric circuit includes a plurality of gate circuits connected between some of said output terminals and some of said light emitting elements which correspond to far distance zones, and a pulse generator for generating a train of pulses of a desired frequency, and wherein said switch means includes a change-over switch for selectively connecting different groups of said gate circuits to said pulse generator in association with the film sensitivity setting such that the group of said gate circuits which are connected to said pulse generator allow intermittent passing of said zone distance signal to a corresponding one of said light emitting elements respectively and wherein the remaining group of said gate circuits which are not connected to said pulse generator allow continuous passing of said zone distance signal to a corresponding one of said light emitting elements respectively.

4. A distance indication device as defined in claim 3, wherein said camera is adapted to be selectively set to a natural light photographing mode and a flash photographing mode and further comprising means for actuating said pulse generator only when said camera set to the flash photographing mode.

5. A distance indication means as defined in claim 1, wherein said indication means includes segment display means and a decoder connected between said distance measuring means and said segment display means for enabling said segment display means to make a segment display of the distance up to the target object in response to said distance signal from said distance measuring means.

6. A distance indication device as defined in claim 5, wherein said electric circuit includes means for continuously driving said segment display means to enable said segment display to make a continuous segment display in response to said distance signal when said distance signal represents a distance within the maximum flash association distance while intermittently driving said segment display means to enable said segment display to make an intermittent segment display in response to said distance signal when said distance signal represents a distance outside of the maximum flash association distance.

* * * * *